US012339781B2

(12) United States Patent
Vankamamidi et al.

(10) Patent No.: US 12,339,781 B2
(45) Date of Patent: Jun. 24, 2025

(54) MANAGING TRANSIENT SNAPSHOTS FOR REDUCED METADATA WRITES

(71) Applicant: Dell Products L.P., Round Rock, TX (US)

(72) Inventors: Vamsi K. Vankamamidi, Hopkinton, MA (US); Mayank Ajmera, Cary, NC (US); Vikram Prabhakar, Apex, NC (US); Socheavy Heng, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/361,399

(22) Filed: Jul. 28, 2023

(65) Prior Publication Data

US 2025/0036569 A1 Jan. 30, 2025

(51) Int. Cl.
*G06F 12/00* (2006.01)
*G06F 12/0875* (2016.01)
*G06F 12/0891* (2016.01)

(52) U.S. Cl.
CPC ...... *G06F 12/0875* (2013.01); *G06F 12/0891* (2013.01); *G06F 2212/1032* (2013.01); *G06F 2212/1044* (2013.01)

(58) Field of Classification Search
CPC ... G06F 12/00; G06F 12/0875; G06F 12/0891

USPC .......................................... 711/135
See application file for complete search history.

(56) References Cited

U.S. PATENT DOCUMENTS

| 10,229,127 | B1* | 3/2019 | Shang ................ G06F 12/0833 |
| 11,157,198 | B2 | 10/2021 | Ma et al. |
| 11,507,599 | B2 | 11/2022 | Xu et al. |
| 11,726,991 | B2 | 8/2023 | Wang et al. |
| 2008/0140897 | A1* | 6/2008 | Ganguly ............. G06F 12/1027 711/135 |
| 2012/0066190 | A1* | 3/2012 | Adkins ................ G06F 16/128 707/703 |
| 2022/0334965 | A1 | 10/2022 | Shveidel et al. |
| 2024/0143554 | A1* | 5/2024 | Kaushik ............... G06F 16/128 |
| 2025/0036569 | A1* | 1/2025 | Vankamamidi ..... G06F 12/0891 |

OTHER PUBLICATIONS

Vankamamidi, Vamsi, et al.; "Combining Xcopy's, Unmaps, and Writes in a Single Flush," U.S. Appl. No. 18/156,683, filed Jan. 19, 2023.

* cited by examiner

*Primary Examiner* — Mohamed M Gebril
(74) *Attorney, Agent, or Firm* — BainwoodHuang (57) ABSTRACT

A technique for managing transient snapshots identifies an instruction to create a transient snapshot with an indicator and attempts to delay, based on the indicator, flushing of the instruction from cache to a mapping subsystem at least until the cache receives an instruction to delete the transient snapshot.

20 Claims, 4 Drawing Sheets

MANAGING TRANSIENT SNAPSHOTS FOR REDUCED METADATA WRITES

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Many storage systems are configured to generate snapshots of data objects. As is known, a "snapshot" is a point-in-time version of a data object, which captures the state of the data object as of the moment the snapshot is taken. Some snapshots are long-lived, being retained for hours, days, weeks, months, etc., whereas other snapshots are more short-lived, such as those used for asynchronous replication, malware detection, and the like. Short-lived snapshots are normally deleted shortly after they are created, e.g., within seconds or minutes.

SUMMARY

Unfortunately, short-lived snapshots, also referred to herein as "transient" snapshots, can place high demands on storage systems. For example, each time a storage system creates a transient snapshot, it is normal for the storage system to create mapping metadata for associating logical addresses of the snapshot with corresponding physical addresses where the data blocks of the snapshot are stored. Although a snapshot may initially share a tree of mapping metadata with the data object from which it was created, the mapping tree of the data object splits from the mapping tree of the snapshot over time, as the data object receives new writes, leading to a proliferation of mapping metadata. Further, the mapping metadata for transient snapshots is normally deleted shortly after it is created. In a system in which transient snapshots are created one after another on a per-second(s) or per-minute(s) basis, the cycle of creating and deleting mapping metadata for transient snapshots places high demands on processors and especially on persistent storage devices, such as flash drives, potentially contributing to their premature wear. What is needed is a way of managing transient snapshots that places fewer demands on storage systems.

The above need is addressed at least in part by an improved technique that identifies an instruction to create a transient snapshot with an indicator and attempts to delay, based on the indicator, flushing of the instruction from cache to a mapping subsystem at least until the cache receives an instruction to delete the transient snapshot.

Advantageously, the delayed flushing enables the transient snapshot to come in and out of existence without the mapping subsystem ever having to create or delete any mapping metadata for supporting the transient snapshot, and without having to implement associated splits in mapping trees. Substantial processing resources and cycles of writing and erasing data are therefore avoided, improving efficiency and promoting longevity of persistent storage devices.

Certain embodiments are directed to a method of managing transient snapshots. The method includes, in response to a request to create a transient snapshot of a data object, creating a copy record in a cache, the copy record including an instruction to generate the transient snapshot and having an indicator that signals delayed flushing of the copy record to a mapping subsystem. The mapping subsystem is configured to maintain mapping metadata that associates logical data with corresponding physical data. In response to a request to delete the transient snapshot and while delaying flushing of the copy record based on the indicator, the method further includes creating a delete record in the cache for deleting the transient snapshot. After creating the delete record, the method still further includes flushing from the cache to the mapping subsystem, the mapping subsystem thereafter neither creating nor deleting mapping metadata for the transient snapshot.

Other embodiments are directed to a computerized apparatus constructed and arranged to perform a method of managing transient snapshots, such as the method described above. Still other embodiments are directed to a computer program product. The computer program product stores instructions which, when executed on control circuitry of a computerized apparatus, cause the computerized apparatus to perform a method of managing transient snapshots, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of managing transient snapshots identifies an instruction to create a transient snapshot with an indicator and attempts to delay, based on the indicator, flushing of the instruction from cache to a mapping subsystem at least until the cache receives an instruction to delete the transient snapshot. Advantageously, the delayed flushing enables the transient snapshot to come in and out of existence without the mapping subsystem ever having to create or delete any mapping metadata for supporting the transient snapshot.

Figure 1:
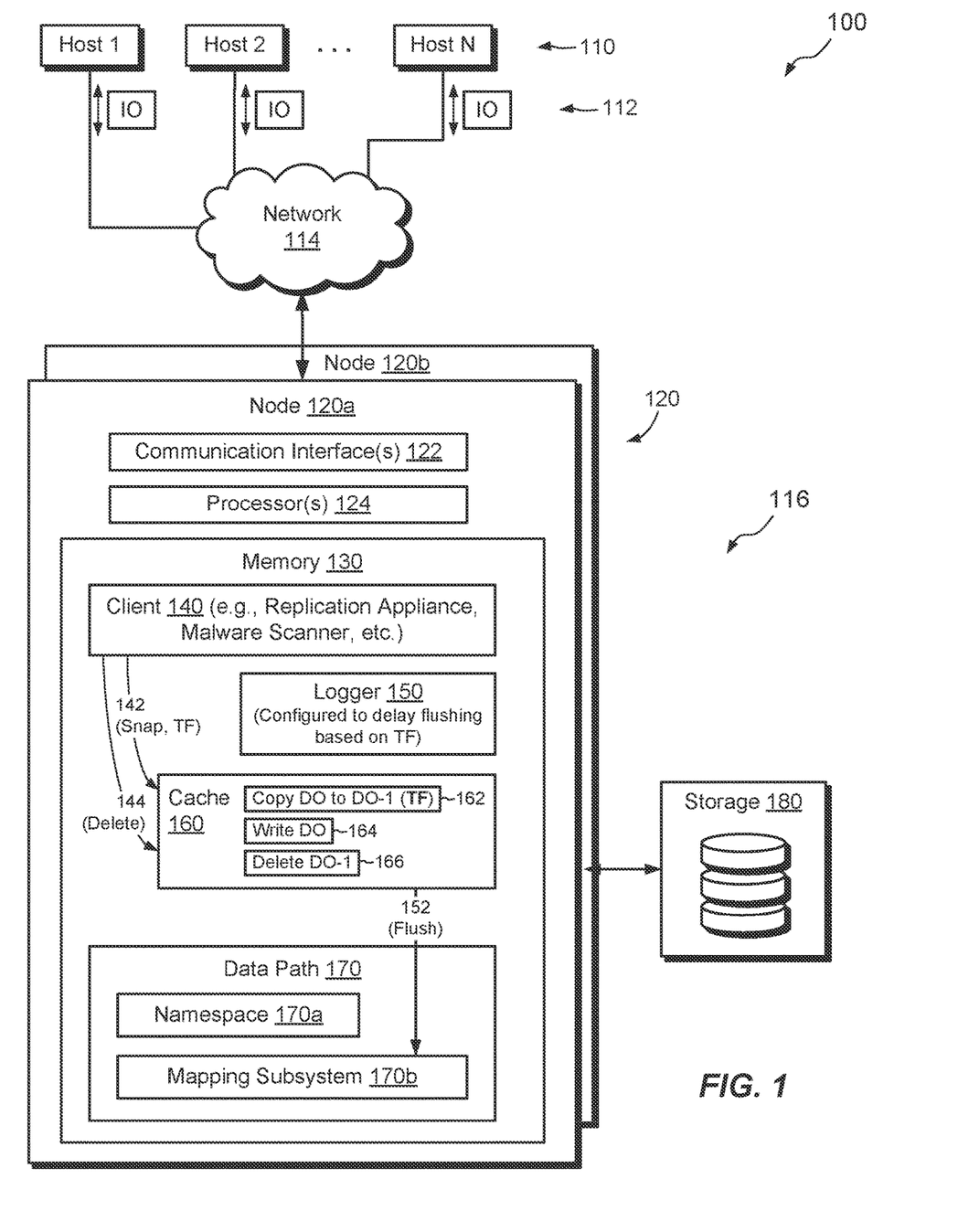
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 180, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 180.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by data and execution of software instructions, a client 140, a logger 150, a cache 160, and a data path 170. The data path 170 may include a namespace 170a and a mapping subsystem 170b.

The namespace 170a is configured to organize logical data, such as logical representations of data objects, snapshots, and the like. For example, the namespace 170a may provide a large logical address space from which data objects and snapshots may be accessed based on logical address, such as LBA (logical block address).

The mapping subsystem 170b, also referred to herein as the "mapper," maintains metadata structures for associating logical addresses in the namespace 170a with physical addresses, which correspond to storage locations of data in the storage 180. Typically, the physical addresses may be expressed as locations within RAID (Redundant Array of Independent Disks) arrays. A separate RAID subsystem (not shown) may provide mapping between RAID addresses and disk-drive addresses. Thus, the term "physical addresses" as used herein is intended to include an intermediate addressing scheme along an overall path between logical addresses and disk-drive locations.

The mapper 170b typically includes multiple layers of metadata mapping pointers, which may be arranged in a tree structure. For example, mapper metadata may include a layer of tops, a layer of mids, and a layer of leaves, wherein each top includes pointers to multiple mids and each mid includes pointers to multiple leaves. Each leaf may point to a respective virtual, which in turn points to a respective physical block. Typically, anytime the mapper 170b receives an instruction to create a data object or a snapshot, the mapper 170b allocates an extent of mapping pointers for the new object.

Continuing with reference to FIG. 1, the client 140 is typically a software application, program, or module that generates transient snapshots. One example of the client 140 is a replication appliance or other replication facility, e.g., one configured to perform asynchronous replication based on consecutive snapshots. Another example of the client 140 is a malware scanner, such as one configured to generate consecutive snapshots and to examine differences between such snapshots to identify patterns of data that suggest that malware attacks are in progress. These are merely examples, however, as the client 140 is not limited to any particular application or use case.

The logger 150 is a software construct configured to organize instructions in proper sequence, to enforce constraints and dependencies, and to control flushing from the cache 160 to the mapping subsystem 170b. In accordance with improvements hereof, the logger 150 is configured to delay flushing of certain instructions based on an indicator.

The cache 160 is configured to store instructions, which instructions may eventually be sent (flushed) to the mapper 170b. In an example, the cache 160 is a transactional cache that arranges instructions in atomic transactions. The cache 160 may be controlled at least in part by the logger 150, which orchestrates flushing 152 of instructions from the cache 160 to the mapper 170b. Such instructions may include, for example, instructions to create a snapshot, delete a snapshot, write to a data object from which a snapshot has been taken, and the like. In an example, the cache 160 is a persistent cache, which is designed to hold its data even in the event of a crash or reboot.

In example operation, hosts 110 issue I/O requests 112 to the data storage system 116. A node 120 receives the I/O requests 112 at the communication interfaces 122 and initiates further processing. Such I/O requests 112 may specify reads and writes of various data objects, such as LUNs (Logical UNits), volumes, file systems, virtual machine disks, and the like.

A particular data object "DO" (e.g., which may be any of the above kinds of data objects) may change in response to writes of the I/O requests 112. To track the changes in DO over time, the client 140 may generate regular snapshots of DO.

In an example, the client 140 provides an instruction 142 to create a snapshot DO-1 of data object DO. In accordance with improvements hereof, the client 140 may identify the new snapshot DO-1 as transient, e.g., by providing a transient indicator, such as a transient flag TF. The transient flag TF may be provided along with the instruction 142, e.g., as part of the instruction 142 or as accompanying data.

Upon receiving the instruction 142, the cache 160 creates a copy record 162 for generating the snapshot and includes the transient flag TF as part of copy record 162. The transient flag TF provides a signal to delay flushing of the copy record 162. As the logger 150 arranges instructions to be flushed 152 from the cache 160 to the mapper 170b, for example, the logger 150 detects the transient flag TF and consequently excludes the copy record 162 from instructions to be flushed.

While flushing of the copy record 162 is being delayed, the node 120 may receive one or more write requests (e.g., writes of I/O requests 112) directed to the data object DO. The cache 160 may record those write requests in one or more write records 164. Based on normal ordering of records, the logger 150 prevents the write record(s) 164 from being flushed until after the copy record 162 is flushed. This operation ensures that the mapper 170b properly accounts for any needed write splits, i.e., creation of new mapping metadata for differentiating the data object DO from the snapshot DO-1.

At some later point while the logger 150 is still delaying flushing of the copy record 162, the client 140 may issue a delete instruction 144 for deleting the snapshot DO-1. For example, the snapshot DO-1 may have served its purpose to the client 140 and is no longer needed. In response to the instruction 144, the cache 160 may create a delete record 166 for deleting snapshot DO-1.

At some later point, e.g., when the logger 150 next identifies a group of records to be flushed, the logger 150 detects that a delete record 166 corresponding to the copy record 162 has been created. As a result of this detection, the logger 150 invalidates the copy record 162. The write record(s) 164, which were previously held back from flushing until the copy record 162 was flushed, are now free to be flushed, as the invalidation of the copy record 164 removes the constraint on the write record(s) 164. Also, invalidation of the copy record 162 ensures that the writes specified by the write record(s) 164 will not induce write splits in the mapper 170b, as there is no potential for block sharing between DO and DO-1, given that DO-1 no longer exists. The write record(s) 164 can then be flushed as ordinary writes, which do not induce write splits in the mapper 170b.

The delayed flushing afforded by the transaction flag TF brings forth a multitude of benefits. For example, the mapper 170b never receives an instruction for creating mapping metadata for DO-1. Nor does the mapper 170b receive an instruction for deleting such mapping metadata. Rather, the mapper 170b may remain oblivious to the existence of DO-1, neither creating nor deleting mapping pointers associated therewith. In addition, writes that would normally result in write splits in the mapper 170b if copy records were allowed to be flushed prior to associated delete records, can no longer create such write splits. Thus, the mapper 170b avoids ever having to create mapping metadata for supporting such write splits. Further still, the mapper 170b avoids having to clean up after such write splits once a snapshot is deleted, e.g., by deleting now-unnecessary mapping metadata that supported the write splits. The dramatic reduction in activity associated with transient snapshots saves considerably on storage resources and can avoid many program-erase cycles on flash drives, thus extending the lifetimes of such devices.

Although instructions 142 and 144 are shown as passing directly from the client 140 to the cache 160, such instructions may alternatively pass through other structures, such as the namespace 170a. For example, the client 140 may send instruction 142 (including the transient flag) and instruction 144 to the namespace 170a, which performs certain activities and forwards the instructions 142 (with TF) and 144 to the cache 160. Such details are not critical to the instant disclosure, however.

The term "transient snapshot" as used herein typically describes a snapshot that is short-lived, e.g., one that exists for seconds or up to a few minutes. However, one should appreciate that a transient snapshot may last for any length of time. Indeed, a transient snapshot is defined simply as a snapshot that is associated with a transient flag TF, regardless of whether the snapshot exists for a second or a day. Whenever the logger 150 sees a copy record 162 accompanied by a transient flag TF, the logger 150 will attempt to delay flushing of that copy record 162, e.g., based on the rationale that the copy record 162 is likely to be followed shortly by a corresponding delete record 166.

Of course, there may be times when it is not feasible for the logger 150 to continue delaying flushing of a particular copy record 162, e.g., on account of resource pressure or time constraints. In such cases, the logger 150 may revert to normal behavior, e.g., by flushing copy records 162 as needed, even if doing so results in activity in the mapper 170b that eventually turns out not to have been needed.

Figure 2:
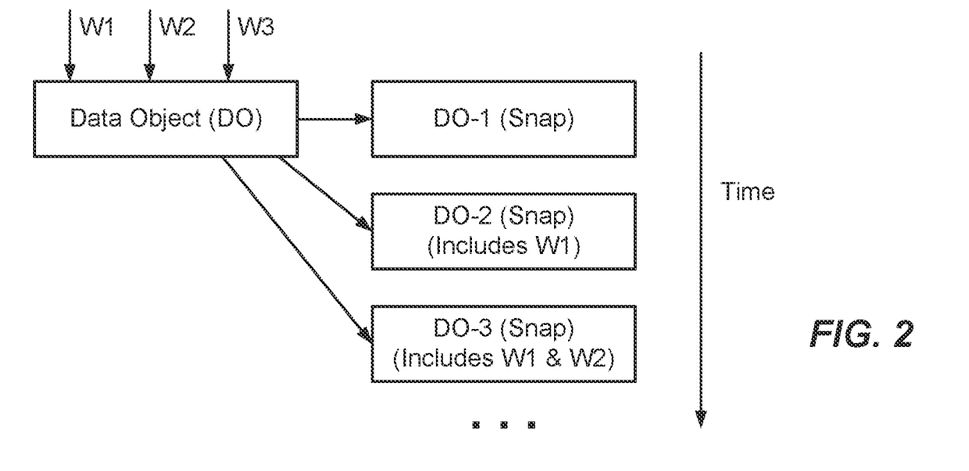
FIG. 2 is a block diagram showing an example sequence of transient snapshots created from a data object in accordance with certain embodiments.

FIG. 2 shows an example arrangement for creating a sequence of transient snapshots, e.g., by the client 140 described in connection with FIG. 1. Here, an initial snapshot DO-1 is created from data object DO. The snapshot DO-1 thus represents the initial state of DO. After the data object DO receives writes W1, another snapshot DO-2 is created. DO-2 thus includes data that was written to DO from writes W1, which arrived during the interval between generating DO-1 and DO-2. After creating DO-2, the data object receives writes W2 and then creates snapshot DO-3, which thus includes data resulting from writes W1 and W2. The pattern may continue, with DO then receiving writes W3 and another snapshot (not shown) being created. Snapshots created earlier in the depicted sequence may be deleted once they are no longer needed.

Figure 3:
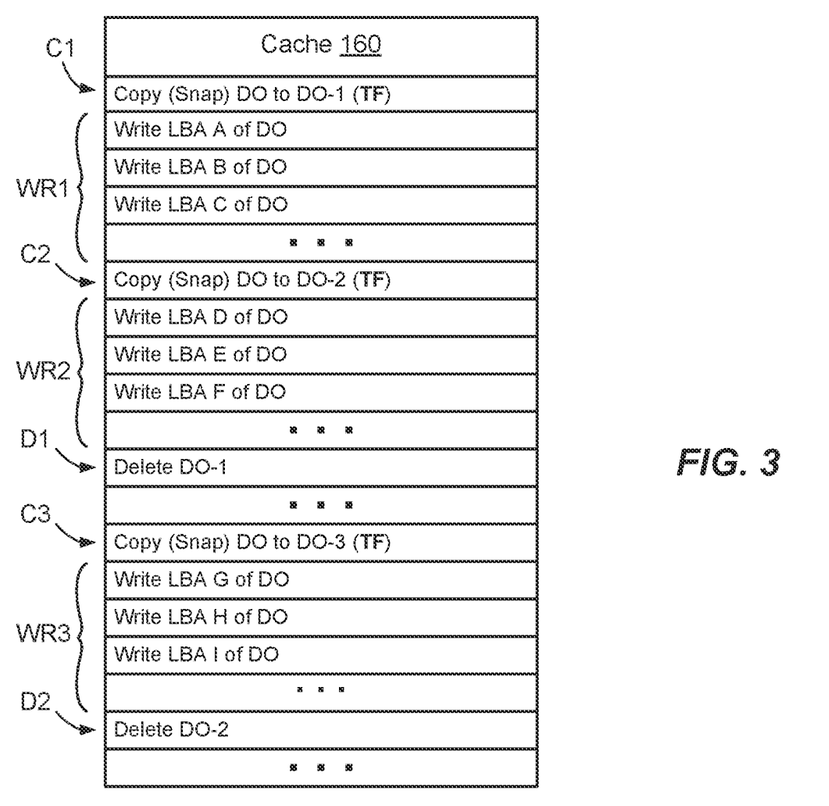
FIG. 3 is a block diagram showing an example sequence of instructions for processing the sequence of transient snapshots of FIG. 2 in accordance with certain embodiments.

FIG. 3 shows an example arrangement of records in the cache 160 for managing the snapshots of FIG. 2. One should appreciate that the sequence of instructions shown is merely an example and is not intended to be limiting.

Here, in response to an instruction 142 from the client 140, the cache 160 creates a copy record C1. The copy record C1 may be a specific example of the copy record 162 of FIG. 1 and specifies the creation of snapshot DO-1 from data object DO. The copy record C1 has an associated transient flag TF, which identifies the snapshot DO-1 as transient.

After creation of the copy record C1, the data object DO receives writes W1 (e.g., writes to LBAs A, B and C of DO), which result in the creation of write records WR1 in the cache 160. Write records WR1 may be examples of write record 164 of FIG. 1. Any number of write records may be created for any number of writes W1 to DO. One should appreciate that the write records WR1 would normally induce write splits in the mapper 170b if the copy record C1 were allowed to be flushed before the write records WR1 were flushed. This outcome may be avoided, however, by delaying flushing of C1 based on the transient flag TF.

Sometime later, e.g., in response to another instruction 142 from the client 140, the cache 160 creates copy record C2, specifying the creation of snapshot DO-2 and including a transient flag TF. Snapshot DO-2 reflects the changes in DO that accumulated based on the writes W1.

Additional writes W2 may follow, resulting in creation of write records WR2 (e.g., for LBAs D, E, and F of DO). As above, the write records WR2 would normally induce write splits in the mapper 170b, if the copy record C2 were allowed to be flushed before the write records WR2 where flushed. This outcome may again be avoided, however, by delaying flushing of C2 in response to the transient flag TF.

In response to a delete instruction 144 then arriving from the client 140, the cache 160 may create a delete record D1 for deleting DO-1. The delete record D1 may be an example of the delete record 166 of FIG. 1. The logger 150 may then associate D1 with C1 and invalidate C1. The result of such invalidation would be to allow write records WR1 to be flushed without inducing write splits in the mapper 170b. Rather, writes W1 as specified in WR1 would proceed as ordinary writes (e.g., overwrites) to DO. As there is no longer any block-sharing relationship between DO and DO-1 (which no longer exists), the writes W1 can be performed with only minimal consequences in the mapper 170b.

Continuing with the example, the cache 160 may create another copy record C3, e.g., in response to another instruction 142, for creating snapshot DO-3. Once again, the transient flag TF is used. Snapshot DO-3 reflects changes in DO from both writes W1 and W2. Various writes W3 then ensue (e.g., to LBAs G, H, and I of DO), resulting in the creation of write records WR3. Once again, the write records WR3 would induce write splits in the mapper 170b if the copy record C3 were flushed before WR3. This outcome is again avoided by the transient flag TF.

Sometime later, the cache 160 creates delete record D2 for deleting DO-2, e.g., in response to another delete instruction 144. The logger 150 may then associate D2 with C2 and invalidate C2. The result of such invalidation would be to allow write records WR2 to be flushed without inducing write splits in the mapper 170b.

As thus illustrated, sequences that involve creating and deleting multiple transient snapshots can be managed with only minimal consequences in the mapper 170b, which can avoid creating mappings for the snapshots, deleting mappings for the snapshots, performing write splits when there is block sharing with the snapshots, and cleaning up after the write splits.

In the depicted example, D1 (the deletion of DO-1) is placed before C3 (the creation of DO-3). This would leave DO-2 as the only existing snapshot. In an example, the order of these operations is under control of the client 140 and may be based, for example, on whether the application 140 requires at least two snapshots to exist at any given time. For example, D1 could alternatively occur after C3 with no consequence in the mapper 170b.

Figure 4A:
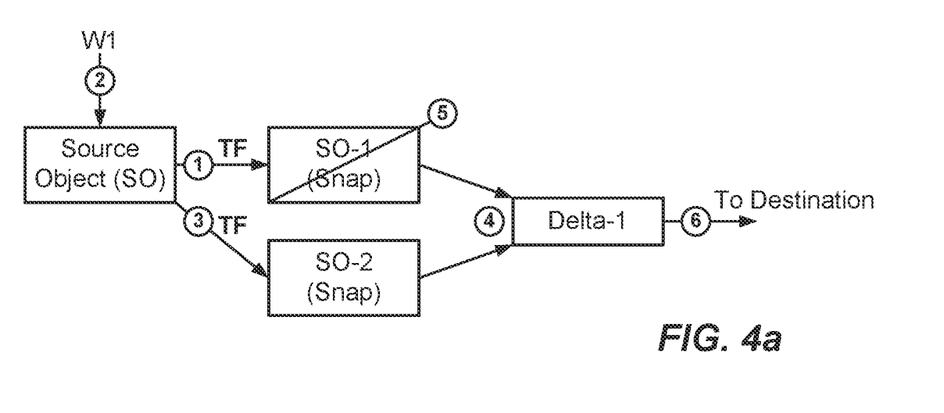
FIGS. 4a and 4b are block diagrams showing an example sequence of activities for performing asynchronous replication of a source data object using transient snapshots in accordance with certain embodiments.
Figure 4B:
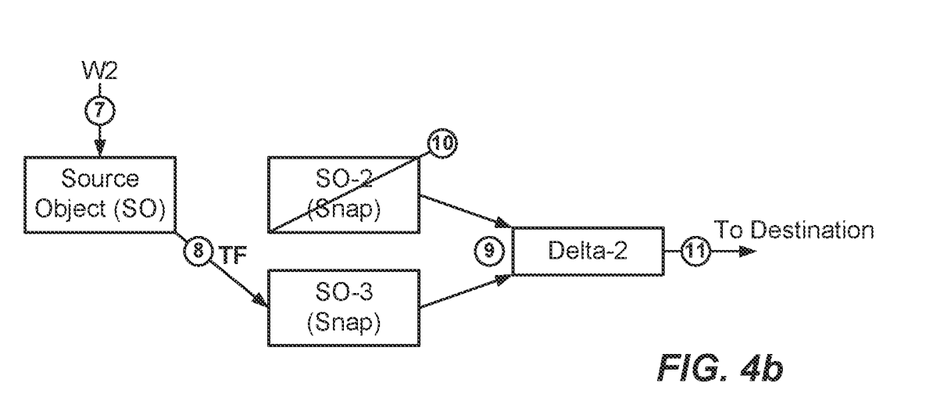

FIGS. 4a and 4b show a specific example of the sequence of snapshots depicted in FIGS. 2 and 3. Here, the data object (DO) is identified as source object (SO), which is undergoing asynchronous replication to a target object, which may typically be hosted on another data storage system (not shown) at another physical location. Asynchronous replication proceeds by taking sequence of snapshots of the source object, identifying differences between consecutive snapshots, and sending those differences to the target (destination) object for incorporation into the target object. Snapshots of the source object are typically created on a regular basis, and the time between successive snapshots is related to an RPO (recovery point objective) of the source object, i.e., a maximum amount of data of the source object that can be lost without violating service level agreements.

Modern data storage systems aim to provide smaller and smaller RPOs, which involves taking successive snapshots of source objects at higher and higher rates. Some replication scenarios call for generating a new snapshot every few seconds. Such scenarios are excellent candidates for use with embodiments described herein, which manage transient snapshots with greatly reduced consequences in the mapper 170b.

In FIG. 4a, the encircled numerals depict an example sequence of events. The ensuing description represents circles around numerals using parentheses.

At (1), the client 140, which may be configured as a replication appliance or other replication program, sends an instruction 142 to create a snapshot SO-1 of the source object SO using the transient flag TF. The cache 160 creates a copy record 162 for recording an intent to create the transient snapshot SO-1.

At (2), the source object SO receives writes W1 to various LBAs of the source object. These writes W1 induce the cache 160 to create write records 164, such as records WR1 (FIG. 3).

At (3), the client 140 issues another instruction 142 with a transient flag TF, this time to create a snapshot SO-2 from the source object. The cache 160 creates a copy record 162 for recording an intent to create the transient snapshot SO-2.

At (4), the client 140 computes a deltaset (Delta-1), which represents differences between SO-1 and SO-2. Such differences are reflective of writes W1, for example. In an example, Delta-1 is created in memory 130 and is not backed by any persistent storage object.

At (5), the client 140 may issue a delete instruction 144 to delete SO-1. The cache 160 responds by creating delete record 166 for deleting SO-1. The logger 150 may respond to this delete record by invalidating the corresponding copy record 162 for SO-1. Invalidating the copy record allows write records for writes W1 to be flushed without inducing write splits, and without requiring the creation or deletion of extents for SO-1 in the mapper 170b.

At (6), the storage node 120 sends Delta-1 to the destination, where the specified changes may be incorporated into the target object to bring it up to date with the source object, SO.

One should appreciate that some of the ordering shown in FIG. 4a is merely an example. For instance, the operations depicted by (5) and (6) can clearly be reversed in time. Thus, the depicted example is merely illustrative.

FIG. 4b shows a continuation of the activities begun in FIG. 4a. At (7), the source object SO receives writes W2 to various LBAs of the source object. These writes W2 induce the cache 160 to create write records 164, such as records WR2 (FIG. 2).

At (8), the client 140 issues another instruction 142 with a transient flag TF, this time to create a snapshot SO-3 from the source object SO. The cache 160 creates a copy record 162 for recording an intent to create the transient snapshot SO-3.

At (9), a new deltaset (Delta-2) is created, which reflects differences between SO-2 and SO-3. For example, Delta-2 reflects changes in the source object SO that reflect the writes W2.

At (10), the client 140 may issue a delete instruction 144 to delete SO-2. The cache 160 responds by creating a delete record 166 for deleting SO-2. The logger 150 may respond to this delete record by invalidating the corresponding copy record 162 for SO-2. Invalidating the copy record allows write records for writes W2 to be flushed without inducing write splits, and without requiring the creation or deletion of extents for SO-2 in the mapper 170b.

At (11), the storage node 120 sends Delta-2 to the destination, where the specified changes may be incorporated into the target object to bring it up to date with the source object SO. Activities (10) and (11) can clearly be reversed in time.

Figure 5:
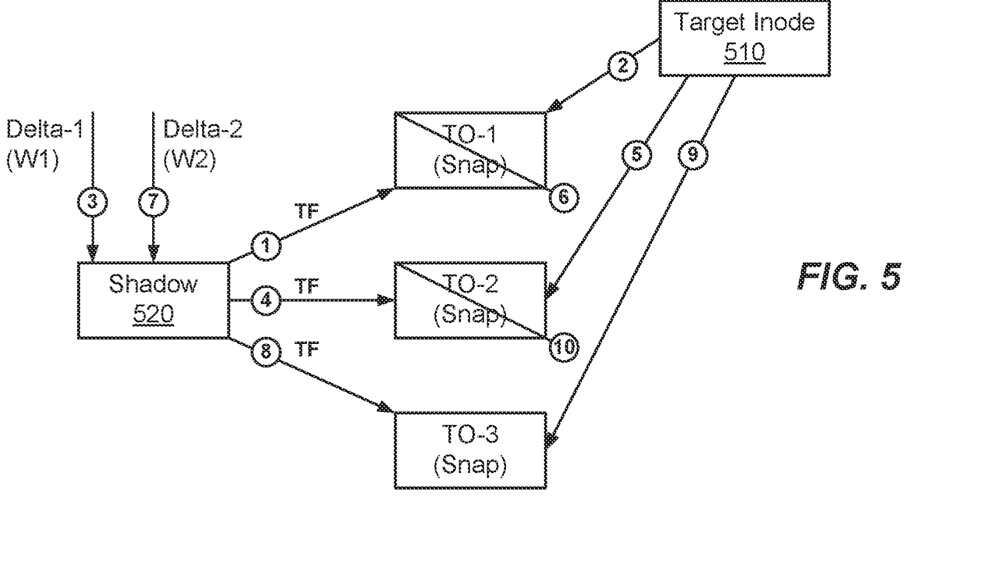
FIG. 5 is a block diagram showing an example sequence of activities for updating a target of asynchronous replication in accordance with certain embodiments.

FIG. 5 shows an example arrangement for incorporating deltasets (e.g., Delta-1, Delta-2, etc.) into a target object at an asynchronous-replication destination. In an example, FIG. 5 depicts activities at the replication destination that result from the activities shown in FIGS. 4a and 4b, which are performed at the replication source.

In the example shown, a target inode (index node) 510 represents the target data object and points sequentially to successive snapshots, which represent respective point-in-time versions of a shadow object 520. The shadow object 520 provides a most recent version of the target object. Once again, encircled numerals depict an example sequence of activities.

At (1), a client 140 running at the destination may issue an instruction 142 to capture an initial state of the shadow object 520 in snapshot TO-1. As before, cache 160 in the destination storage system creates a copy record 162 for creating the snapshot TO-1 of the shadow object 520 and marks that record with a transient flag, TF.

At (2), the client 140 at the destination points the target inode 510 to the snapshot TO-1, thereby causing TO-1 to present the most recent stable version of the target object.

At (3), the client 140 receives updates for Delta-1 from the source and applies those updates to the shadow object 520, such that the shadow object 520 reflects the writes W1 included in Delta-1 (FIG. 4a). To this end, the cache 160 at the destination system creates write records 164 representing writes W1 to the shadow object 520.

At (4), the client 140 creates another snapshot TO-2 of the shadow object 520. For example, cache 160 in the destination system creates a copy record 162 for creating the snapshot TO-2 and marks that record with a transient flag, TF. The snapshot TO-2 reflects the writes W1 applied as part of Delta-1 at (3).

At (5), the client 140 in the destination system points the target inode 510 to the snapshot TO-2, thereby causing TO-2 to present the most recent stable version of the target object, instead of TO-1.

At (6), the client 140 may issue an instruction 144 to delete TO-1, which is no longer needed. For example, the cache 160 on the destination system creates a delete record 166. A logger 150 running on the destination system detects the delete record for TO-1 and invalidates the corresponding copy record for TO-1, which was created at (1). Invalidating the copy record allows the write records 164 for W1 (those created at (3)) to be flushed as ordinary writes, i.e., without inducing write splits in the mapper 170b on the destination system.

At (7), the client 140 receives updates for Delta-2 from the source and applies those updates to the shadow object 520, such that the shadow object 520 reflects the writes W2 (FIG. 4b). To this end, the cache 160 at the destination system creates write records 164 representing the writes W2 to the shadow object 520.

At (8), the client 140 creates another snapshot TO-3 of the shadow object 520. For example, the cache 160 in the destination system creates a copy record 162 for creating the snapshot TO-3 and marks that record with a transient flag, TF. The snapshot TO-3 reflects the writes W2 applied at (7).

At (9), the client 140 in the destination system points the target inode 510 to the snapshot TO-3, thereby causing TO-3 to present the most recent stable version of the target object, instead of TO-2.

At (10), the client 140 may issue an instruction 144 to delete TO-2, which is no longer needed. For example, the cache 160 on the destination system creates a delete record 166. A logger 150 running on the destination system detects the delete record for TO-2 and invalidates the corresponding copy record for TO-2, which was created at (4). Invalidating the copy record allows the write records 164 for W2 (those created at (7)) to be flushed as ordinary writes, i.e., without inducing write splits in the mapper 170b on the destination system.

Operation may proceed in this manner, with additional deltasets being received and applied to the shadow object 520, with new snapshots of the shadow object 520 being created, and with older snapshots being deleted. All of this activity may proceed with minimal impact on the mapper 170b on the destination system, which can treat writes that result from applying the deltasets as ordinary writes, rather than as write splits, and which can proceed without the need to create or delete mapping metadata for supporting snapshots of the shadow object 520, provided that delayed flushing of copy records can be achieved.

Figure 6:
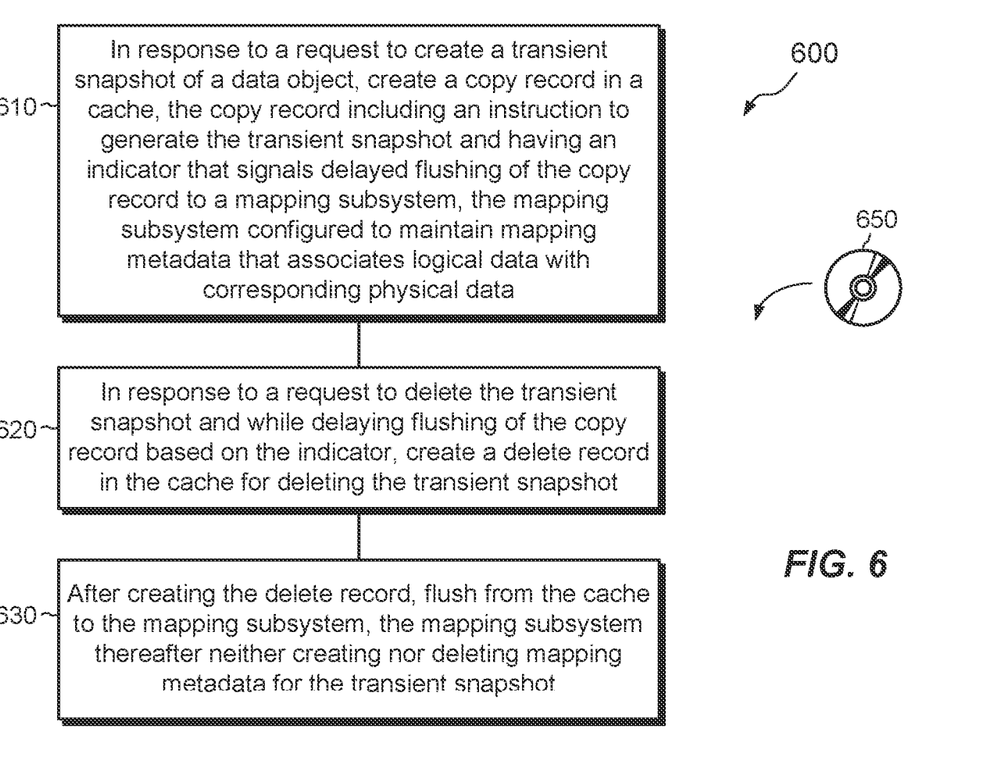
FIG. 6 is a flowchart showing an example method of managing transient snapshots.

FIG. 6 shows an example method 600 of managing transient snapshots and provides an overview of some of the features described above. The method 600 is typically performed, for example, by the software constructs described in connection with FIG. 1, which reside in the memory 130 of the node 120 and are run by the set of processors 124. The various acts of method 600 may be ordered in any suitable way. Accordingly, embodiments may be constructed in which acts are performed in orders different from that illustrated, which may include performing some acts simultaneously.

At 610, a copy record 162 is created in a cache 160 in response to a request 142 to create a transient snapshot (e.g., DO-1, SO-1, TO-1, etc.) of a data object (e.g., DO, SO, Shadow Object, etc.). The copy record 162 includes an instruction to generate the transient snapshot and has an indicator (TF) that signals delayed flushing 152 of the copy record 162 to a mapping subsystem 170b. The mapping subsystem 170b is configured to maintain mapping metadata (e.g., tops, mids, leaves, etc.) that associates logical data with corresponding physical data.

At 620, in response to a request 144 to delete the transient snapshot and while delaying flushing of the copy record 162 based on the indicator (TF), a delete record 166 is created in the cache 160 for deleting the transient snapshot.

At 630, after creating the delete record 166, flushing 152 is performed from the cache 160 to the mapping subsystem 170b. The mapping subsystem 170b thereafter neither creates nor deletes mapping metadata for the transient snapshot.

An improved technique has been described for managing transient snapshots. The technique identifies an instruction 162 to create a transient snapshot, e.g., DO-1 with an indicator (TF) and attempts to delay, based on the indicator, flushing 152 of the instruction 162 from cache 160 to a mapping subsystem 170b at least until the cache 160 receives an instruction 144 to delete the transient snapshot DO-1. Advantageously, the delayed flushing enables the transient snapshot DO-1 to come in and out of existence without the mapping subsystem 170b ever having to create or delete any mapping metadata for supporting the transient snapshot. Substantial processing resources and cycles of writing and erasing data are therefore avoided, improving efficiency and promoting longevity of persistent storage devices.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second'" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing transient snapshots, comprising:
   in response to a request to create a transient snapshot of a data object, creating a copy record in a cache, the copy record including an instruction to generate the transient snapshot and having an indicator that signals delayed flushing of the copy record to a mapping subsystem, the mapping subsystem configured to maintain mapping metadata that associates logical data with corresponding physical data;
   in response to a request to delete the transient snapshot and while delaying flushing of the copy record based on the indicator, creating a delete record in the cache for deleting the transient snapshot; and
   after creating the delete record, flushing from the cache to the mapping subsystem, the mapping subsystem thereafter neither creating nor deleting mapping metadata for the transient snapshot.

2. The method of claim 1, further comprising invalidating the copy record responsive to creating the delete record, such that upon flushing, neither the copy record for creating the transient snapshot nor the delete record for deleting the transient snapshot is processed by the mapping subsystem.

3. The method of claim 2, further comprising, after creating the copy record and before creating the delete record, creating a set of write records for writing respective data to the data object, wherein upon flushing from the cache to the mapping subsystem after creating the delete record, the mapping subsystem implements writes of the respective data without inducing write splits to differentiate the data object from the transient snapshot.

4. The method of claim 2, further comprising:
   receiving a plurality of requests to create respective transient snapshots of the data object one after another;
   for each of the plurality of requests, creating a respective copy record and a respective delete record for creating and deleting the respective transient snapshot; and
   neither creating nor deleting mapping metadata in the mapping subsystem for any of the plurality of transient snapshots.

5. The method of claim 4, wherein the data object is a source data object undergoing asynchronous replication to a target data object.

6. The method of claim 5, further comprising identifying changes in the source data object based on differences between time-adjacent pairs of the respective transient snapshots.

7. The method of claim 4, wherein the data object is a shadow data object used for updating a target data object undergoing asynchronous replication from a source data object.

8. The method of claim 7, wherein the respective transient snapshots capture respective states of the shadow data object after applying respective sets of updates computed from transient snapshots of the source data object.

9. The method of claim 4, wherein the respective transient snapshots are snapshots of a data object being scanned for suspected malware.

10. A computerized apparatus, comprising control circuitry that includes a set of processors coupled to memory, the control circuitry constructed and arranged to:
in response to a request to create a transient snapshot of a data object, create a copy record in a cache, the copy record including an instruction to generate the transient snapshot and having an indicator that signals delayed flushing of the copy record to a mapping subsystem, the mapping subsystem configured to maintain mapping metadata that associates logical data with corresponding physical data;
in response to a request to delete the transient snapshot and while delaying flushing of the copy record based on the indicator, create a delete record in the cache for deleting the transient snapshot; and
after creation of the delete record, flush from the cache to the mapping subsystem, the mapping subsystem thereafter neither creating nor deleting mapping metadata for the transient snapshot.

11. The computerized apparatus of claim 10, wherein the control circuitry is further constructed and arranged to invalidate the copy record responsive to creating the delete record, such that upon flushing, neither the copy record for creating the transient snapshot nor the delete record for deleting the transient snapshot is processed by the mapping subsystem.

12. A computer program product including a set of non-transitory, computer-readable media having instructions which, when executed by control circuitry of a computerized apparatus, cause the computerized apparatus to perform a method of managing transient snapshots, the method comprising:
in response to a request to create a transient snapshot of a data object, creating a copy record in a cache, the copy record including an instruction to generate the transient snapshot and having an indicator that signals delayed flushing of the copy record to a mapping subsystem, the mapping subsystem configured to maintain mapping metadata that associates logical data with corresponding physical data;
in response to a request to delete the transient snapshot and while delaying flushing of the copy record based on the indicator, creating a delete record in the cache for deleting the transient snapshot; and
after creating the delete record, flushing from the cache to the mapping subsystem, the mapping subsystem thereafter neither creating nor deleting mapping metadata for the transient snapshot.

13. The computer program product of claim 12, wherein the method further comprises invalidating the copy record responsive to creating the delete record, such that upon flushing, neither the copy record for creating the transient snapshot nor the delete record for deleting the transient snapshot is processed by the mapping subsystem.

14. The computer program product of claim 13, wherein the method further comprises, after creating the copy record and before creating the delete record, creating a set of write records for writing respective data to the data object, wherein upon flushing from the cache to the mapping subsystem after creating the delete record, the mapping subsystem implements writes of the respective data without inducing write splits to differentiate the data object from the transient snapshot.

15. The computer program product of claim 13, wherein the method further comprises:
receiving a plurality of requests to create respective transient snapshots of the data object one after another;
for each of the plurality of requests, creating a respective copy record and a respective delete record for creating and deleting the respective transient snapshot; and
neither creating nor deleting mapping metadata in the mapping subsystem for any of the plurality of transient snapshots.

16. The computer program product of claim 15, wherein the data object is a source data object undergoing asynchronous replication to a target data object.

17. The computer program product of claim 16, wherein the method further comprises identifying changes in the source data object based on differences between time-adjacent pairs of the respective transient snapshots.

18. The computer program product of claim 15, wherein the data object is a shadow data object used for updating a target data object undergoing asynchronous replication from a source data object.

19. The computer program product of claim 18, wherein the respective transient snapshots capture respective states of the shadow data object after applying respective sets of updates computed from transient snapshots of the source data object.

20. The computer program product of claim 15, wherein the respective transient snapshots are snapshots of a data object being scanned for suspected malware.

* * * * *